(12) United States Patent
Ciccone (10) Patent No.: US 8,865,048 B2
(45) Date of Patent: Oct. 21, 2014

(54) INJECTION MOLDING NOZZLE WITH DYNAMIC SEAL

(71) Applicant: Injectnotech, Inc., Mississauga (CA)

(72) Inventor: Vince Ciccone, Kleinburg (CA)

(73) Assignee: Injectnotech Inc., Ontario (CA)

( * ) Notice: Subject to any disclaimer, the term of this patent is extended or adjusted under 35 U.S.C. 154(b) by 115 days.

(21) Appl. No.: 13/730,775

(22) Filed: Dec. 28, 2012

(65) Prior Publication Data

US 2014/0183790 A1    Jul. 3, 2014

(51) Int. Cl.
*B29C 45/20*    (2006.01)
*B29C 45/27*    (2006.01)

(52) U.S. Cl.
CPC ......... *B29C 45/20* (2013.01); *B29C 2045/2762* (2013.01); *B29C 2045/2759* (2013.01)
USPC ...................... 264/328.15; 425/549

(58) Field of Classification Search
CPC ............ B29C 45/27; B29C 2045/2762; B29C 2045/2774; B29C 2045/2791; B29C 2045/2759; B29C 2045/2772
USPC ...................... 264/328.15; 425/549
See application file for complete search history.

(56) References Cited

U.S. PATENT DOCUMENTS

| | | | | |
|---|---|---|---|---|
| 5,896,640 | A * | 4/1999 | Lazinski et al. | 29/428 |
| 6,062,846 | A * | 5/2000 | Kalemba | 425/549 |
| 6,860,732 | B2 * | 3/2005 | Babin et al. | 425/549 |
| 2012/0251657 | A1 * | 10/2012 | Adas et al. | 425/569 |
| 2013/0056562 | A1 * | 3/2013 | Overfield et al. | 239/583 |

* cited by examiner

*Primary Examiner* — Jill Heitbrink
(74) *Attorney, Agent, or Firm* — Kilpatrick Townsend & Stockton LLP (57) ABSTRACT

A manifold, in a first pocket, defines a manifold orifice to supply material to a nozzle in a second pocket. A support ring in the second pocket maintains the nozzle stationary within the second pocket. A bushing extends between the pockets, fixedly attached to the manifold and laterally movable with respect to the pockets and the nozzle. At ambient temperature, the centers of the nozzle and manifold orifices are laterally offset from one another, a preload is defined between the nozzle and the bushing, another preload is defined between the manifold and the nozzle, and a gap is defined between the support ring and the pocket. In operation, when the various components thermally expand, the manifold moves laterally within the first pocket, and the nozzle remains substantially stationary within the second pocket, such that the centers of the nozzle and manifold orifices are laterally aligned, and the gap is closed.

15 Claims, 8 Drawing Sheets

INJECTION MOLDING NOZZLE WITH DYNAMIC SEAL

BACKGROUND OF THE INVENTION

The present invention relates to nozzles for hot runner systems of plastic injection molds, and in particular, to such nozzles equipped with dynamic seals.

Multi-cavity molds use manifolds to transfer molten plastic from a central feeding point, connected to the sprue bar of the injection machine, to a plurality of injection points leading to the molding cavities. A common problem of hot runner systems is the difficulty to control the thermal expansion of the manifold while maintaining effective sealing between nozzles and manifold. Typical challenges may be: excessive thermal expansion of the components, which may cause failure due to pressures, component fatigue, and wear; insufficient thermal expansion, which may cause uneven or minimal contact between mold components, resulting in plastic leaks; or, in the style of nozzles directly screwed into the manifold, excessive lateral expansion of the manifold, causing lateral deflection of the nozzles.

Previous designs depend on the axial thermal expansion of components to create the seal required to prevent plastic leakage. Thus, if the injection process is started before the system reaches full operating temperature, or if a nozzle heater burns out, the system is likely to leak, as the "cold gaps" are not fully closed. A solution is desired, allowing lateral thermal expansion of the manifold while eliminating lateral deflection of the nozzles, and providing improved axial sealing between the nozzles and the manifold without relying solely on the thermal expansion of the components to achieve such sealing.

BRIEF SUMMARY OF THE INVENTION

An injection molding nozzle system includes a mold plate defining a first and a second pocket. A nozzle is provided in the second pocket, and defines a nozzle orifice extending in an axial direction to inject molten material into a mold from a downstream end of the nozzle orifice. A manifold is disposed in the first pocket, and defines a manifold orifice to supply the material to the nozzle orifice. A downstream end of the manifold orifice is in fluid communication with the upstream end of the nozzle orifice. A centering support ring is provided in the second pocket, to maintain the nozzle stationary with respect to the second pocket. A bushing extends between the first and second pockets, fixedly attached to the manifold and laterally movable with respect to the pockets and to the nozzle.

At ambient temperature, the centers of the nozzle orifice and the manifold orifice are offset from one another in the lateral direction, a preload is defined between abutting surfaces of the nozzle and the bushing, an additional preload is defined between abutting surfaces of the manifold and the nozzle, and a gap is defined between the support ring and a shoulder at a downstream end of the second pocket. In operation, the manifold and the nozzle reach respective operating temperatures and thermally expand, such that the manifold moves laterally within the first pocket, and the nozzle remains substantially stationary within the second pocket. The centers of the nozzle orifice and the manifold orifice are thus aligned in the lateral direction, and the gap is closed by thermal expansion of the various components.

The gap may be closed to a preload of approximately 0.001" to approximately 0.003".

An additional gap may be defined between the support ring and the bushing at the ambient temperature.

The system may further include dowels disposed between the nozzle and the manifold to prevent rotational movement of the nozzle with respect to the manifold.

The bushing may include a flange abutting a downstream end of the manifold, and a collar defining an inner shoulder portion slidable within a notch of the nozzle.

The system may further include a puck disposed between the manifold and the bushing.

For a further understanding of the nature and advantages of the invention, reference should be made to the following description taken in conjunction with the accompanying drawings.

DETAILED DESCRIPTION OF THE INVENTION

Figure 1:
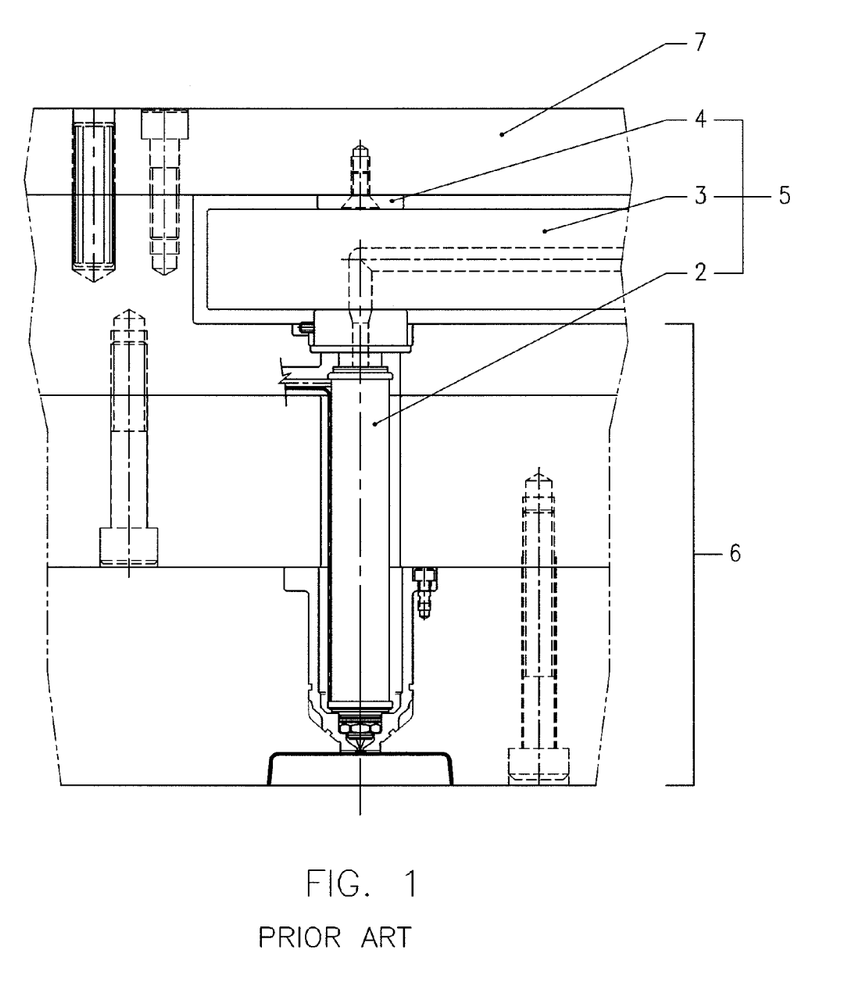
FIG. 1 is an exemplary vertical sectional view of an injection molding nozzle system typical of the prior art.
Figures 2, 5:
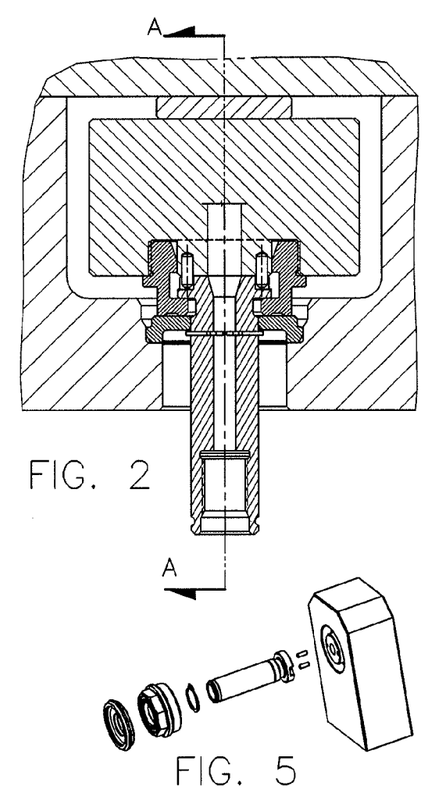
FIG. 2 is an exemplary vertical sectional view of an injection molding nozzle system in accordance with a preferred embodiment of the invention.
FIG. 5 is an exemplary exploded perspective view of the injection molding system of FIG. 2.
Figure 3:
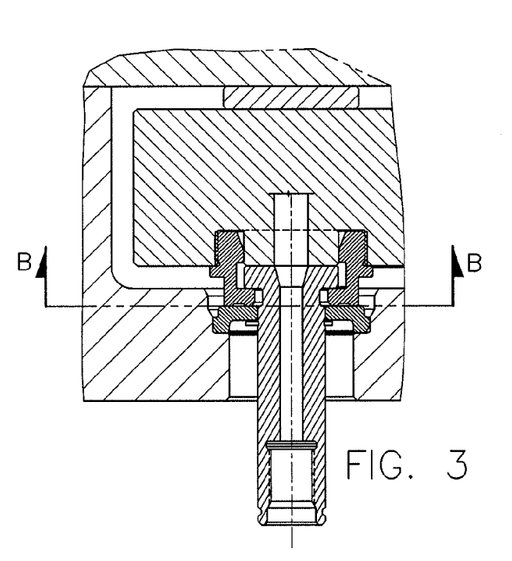
FIG. 3 is an exemplary vertical sectional view of the injection molding nozzle system of FIG. 2, taken along line A-A of FIG. 2.
Figure 4:
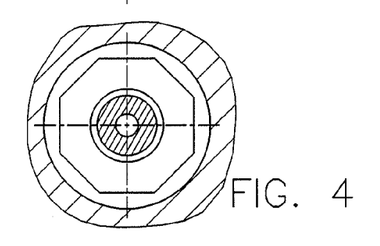
FIG. 4 is an exemplary horizontal sectional view taken along line B-B of FIG. 3.

With reference to FIG. 1, which shows a typical prior art system, a nozzle 2, manifold 3, and pressure pad 4 create a compression packet 5 between mold plates 6 and back plate 7. Such systems are designed to have a cold gap between the nozzle 2 and the manifold 3 of typically 0.000" to 0.003" (inches), or as high as 0.012" in some cases. The term "cold gap," as used herein, refers to the distance between the nozzle 2 and the manifold 3 at about room temperature. The typical nozzle/manifold assembly has an axial thermal expansion of 0.007"-0.017" when heated to an operating temperature, usually around 400° F.-600° F. Consequently, substantial pressure forces are exerted on the manifold assembly steels and on to the mold plates and the fasteners securing them.

Figure 6:
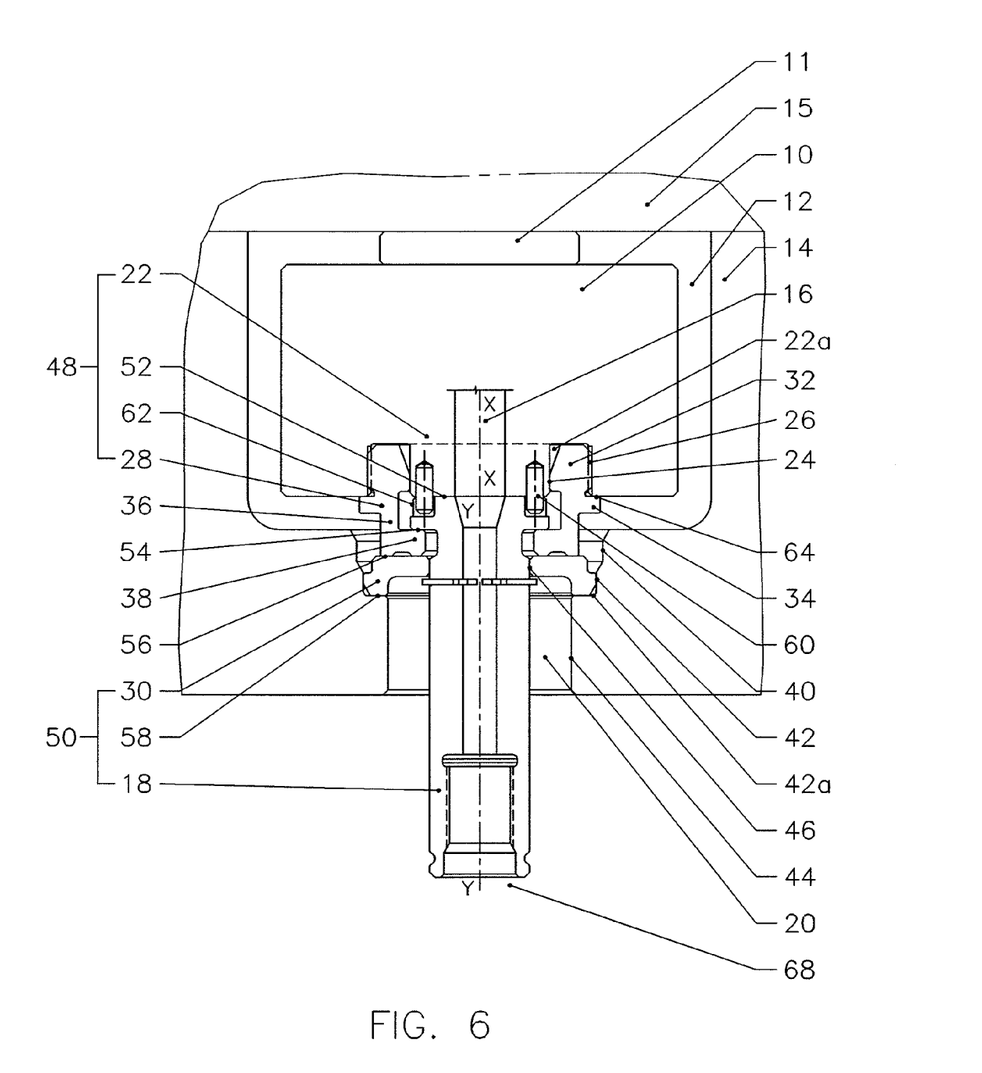
FIG. 6 is an enlarged view of FIG. 2.
Figure 7:
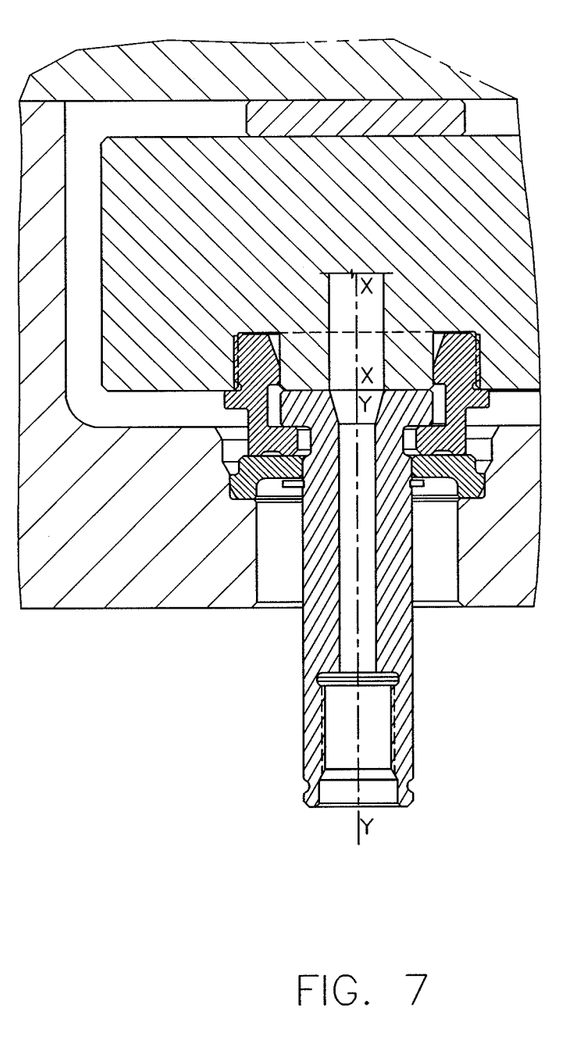
FIG. 7 is an enlarged view of FIG. 3, showing the injection molding nozzle at operating temperature, where axes X-X and Y-Y are in alignment.

A detailed description of the preferred embodiment of the invention follows, with reference to the sectional views of FIGS. 6 and 7. A manifold 10, located in a pocket 12 of a mold plate 14 and backed by a pressure pad 11 secured to a back plate 15 (or to manifold 10, securing means not shown), has an outlet hole 16 directing the flow of molten plastic to a nozzle 18 extending through a pocket 20 of mold plate 14. The system is described herein with reference to one such nozzle; however, it should be understood that a plurality of nozzles may be in use with the manifold and mold plates, as necessitated by the scope of the application. A portion 22 of manifold 10 adjacent to nozzle 18 has an annular groove 22*a* concentric with outlet hole 16, the inner surface of this annular groove being a cylindrical centering surface 24, while the outer surface of the annular groove has a threaded portion 26.

The system further comprises a bushing 28 and a centering support ring 30. Bushing 28 has a protrusion 32 threadably connected to manifold 10 via thread 26 and centered about axis X-X of outlet hole 16 by the cylindrical surface 24. The cylindrical surface 24 not only centers the bushing 28, but also serves to protect thread 26 from seizing laterally, which might otherwise occur due to lateral movement of the manifold during operation. Bushing 28 further has a flange 34 and a collar 36 having an inner shoulder portion 38. Outer surface of collar 36 is shaped to allow easy torquing (as necessary for installation of bushing 28 into manifold 10 via thread 26), having a pair or series of opposing flat surfaces, such as, for example, a hexagonal or an octagonal shape.

Pocket 20 of mold plate 14, having axis Y-Y as shown in FIG. 6, has a lead-in portion 40, a centering cylindrical portion 42, and a clearance portion 44. The centering cylindrical portion 42 terminates at its bottom (in FIG. 6) end at a shoulder 42*a*. Lead-in portion 40 may be of conical shape, or a combination of conical and cylindrical surfaces such as that shown in FIG. 6, where the cylindrical lead-in portion is of larger diameter than the centering cylindrical portion 42, in order to allow easy insertion of support ring 30 into the pocket. Cylindrical portion 42 thus centers support ring 30 about axis Y-Y of pocket 20. An inner cylindrical portion 46 of support ring 30, concentric with cylindrical portion 42, further centers nozzle 18 along axis Y-Y.

Figure 7A:
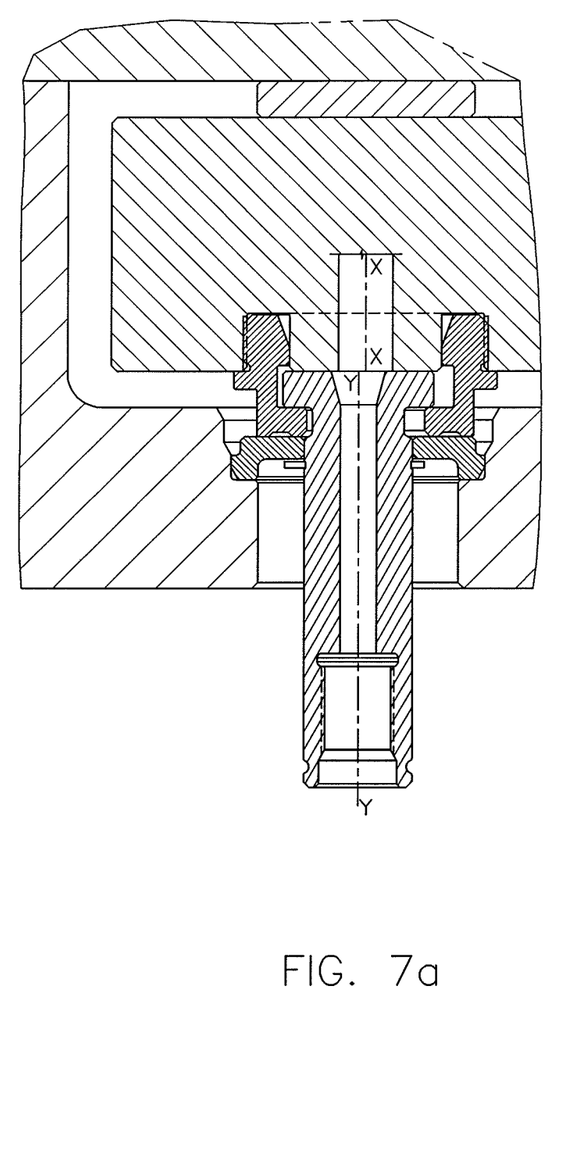
FIG. 7a is an enlarged view of FIG. 3, showing the injection molding nozzle in cold condition, where axes X-X and Y-Y are out of alignment.
Figures 8, 9, 10, 11:
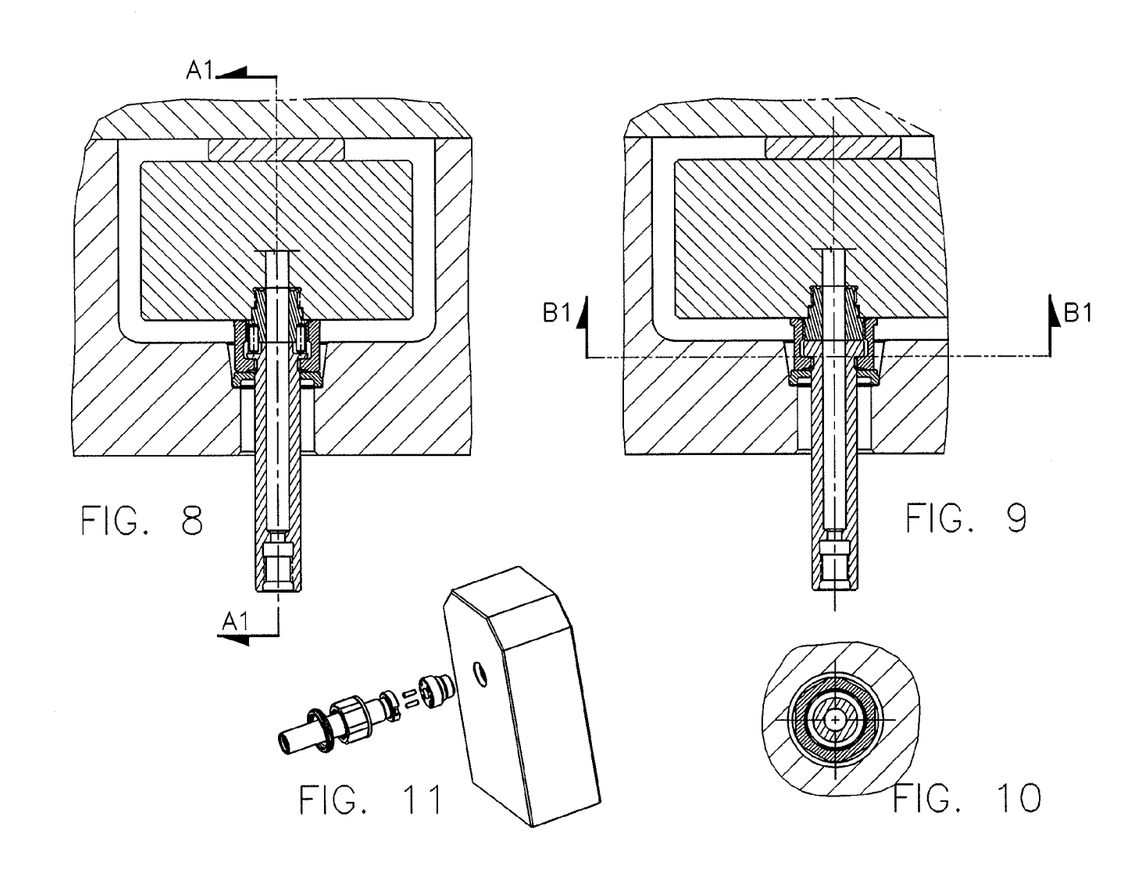
FIG. 8 is an exemplary vertical sectional view of an injection molding nozzle system in accordance with an alternative embodiment of the invention.
FIG. 9 is an exemplary vertical sectional view of the injection molding nozzle system of FIG. 8, taken along line A1-A1 of FIG. 8.
FIG. 10 is an exemplary horizontal sectional view along line B1-B1 of FIG. 9.
FIG. 11 is an exemplary exploded perspective view of the injection molding system of FIG. 8.

As can be further seen in FIG. 6, bushing 28 and portion 22 of manifold 10 form a packet 48 centered about axis X-X of outlet hole 16, while nozzle 18 and support ring 30 form a packet 50 centered about axis Y-Y of pocket 20 of mold plate 14. The system is designed with a preset lateral misalignment of axes X-X and Y-Y in cold (i.e. room temperature) condition (shown exaggerated for clarity in FIG. 7*a*, which is seen from the direction perpendicular to FIG. 6), the two axes aligning as the system reaches operating temperature.

The nozzle system of FIG. 6 has a preload at interfaces 52 (between manifold 10 and nozzle 18) and 54 (between shoulder of nozzle 18 and inner shoulder of bushing 28), and a cold gap at interfaces 56 (between bushing 28 and support ring 30) and 58 (between support ring 30 and shoulder 42*a*). The size of the cold gap varies with the application, being dependent on the thermal growth of the manifold thickness, such that the gap is reduced to zero at operating temperature. As an example, the system may have a preload of 0.001" to 0.003" when fully heated. While the forces resulting from the high preloads of conventional systems are transferred to mold plates and their fasteners, putting them under considerable strain, the present design transfers forces (of much smaller preloads, as explained above) from manifold 10, to shoulder of nozzle 18, to inner shoulder 38 of bushing 28, and back onto the manifold through flange 34 of bushing 28, thus not subjecting the mold plates to unnecessary forces, consequently extending the life of the mold.

Furthermore, as the nozzle assembly is installed by threading bushing 28 into the manifold and torquing until flange 34 is in firm contact with the manifold at interface 64 according to proper torquing methods, the preload pressure at interfaces 52 and 54 creates a mechanical seal, preventing plastic leaks even if the injection process were to start prematurely, before reaching full operating temperature. Even if plastic were to leak at interface 52, the mechanical seals at interfaces 54 and 64 would prevent it from reaching the mold plate pocket, which is a common problem of conventional systems, where plastic leaks may fill up the mold plate pockets, damaging nozzle heaters and causing extensive downtime, resulting in costly repairs.

The nozzle system disclosed herein provides a pre-set, fully controlled pre-loaded system. Prior art systems start anywhere from zero to 0.003" gap at ambient temperature, while at operating temperatures the system could load to 0.017" and higher, putting considerable compression strain on the mold steels. The system disclosed herein, on the other hand, allows the pre-loads to be set mechanically at ambient temperature, and maintains those pre-loads at operating temperatures. The loads caused by thermal expansion of mold components are now prevented from being transferred to the mold steels.

In more detail, as bushing 28 is hand-torqued into the annular groove 22*a* of manifold 10, the inner shoulder portion 38 (of collar 36 of bushing 28) compresses nozzle 18 against manifold 10. At this stage, there is a pre-set gap between flange 34 of bushing 28 and manifold 10 at interface 64. As the desired amount of torque is further applied with a torque wrench, the inner shoulder portion 38 distorts, causing flange 34 to deflect and close the gap. Thus, the portion of bushing 28 projecting outwardly from the face of the manifold (i.e. collar 36, inner shoulder portion 38, and flange 34) in effect becomes a high-tension spring, holding constant tension on the nozzle against the manifold, thus applying the appropriate preloads mechanically (i.e. without the need to bring the system to operating temperature). The size of the gap at interface 64 is tightly toleranced, chosen to achieve the adequate amount of mechanical preload at interfaces 52 and 54 in cold condition. It should be noted that protrusion 32 of bushing 28 is not in contact with the manifold at the top of the groove 22*a*; there is a small gap between these elements (somewhat visible in FIG. 6). Thus, the flange 34 abutting the manifold 10 at 64, and not the protrusion 32 abutting the manifold, limits how far the bushing 28 can be threaded into the annular groove 22*a*.

The mechanical preloads of the system described herein allow cold start-ups without danger of leaks. A drawback of conventional systems is that they rely on axial thermal expansion of components to achieve sealing against plastic leaks. If the injection process is started before reaching full operating temperature, the system is likely to leak as the cold gaps are not fully closed. The system described herein eliminates this problem by having mechanical preloads pre-set in cold condition, as explained above.

In conventional systems of multi-cavity applications, if there is a problem with one of the cavities, it is common practice to shut off its nozzle heater, resulting in a cold nozzle, i.e. a different preload on one nozzle compared to the other nozzles, which may cause leaks and flashing. Similarly, if a nozzle heater burns out without the mold operator noticing, there is danger of plastic leaks. However, the mechanically set and held preloads of the system described herein prevent flashing even if a nozzle changes temperature for any reason.

A further advantage is extended life. As mentioned previously, a typical nozzle/manifold assembly can have a thermal axial expansion as high as 0.017" when heated to operating temperature. This results in high compressive loads on the steels of the mold plates and manifold, the manifold being susceptible to hobbing between nozzles and pressure pads, sometimes leading to indentations so large they are visible with the naked eye. Such wear shows that prior art systems have a greater chance of leakage as time progresses. The current system, with a zero gap or a preload of 0.001" to 0.003" when fully heated, will have a considerably longer life than conventional systems.

Further features and benefits of the system described herein include the preloaded seal at interface 64 via flange 34, the preload force being calculated such that it retains nozzle 18 in place and seals it, but all along allowing the manifold to expand laterally so that axes X-X and Y-Y become aligned at operating temperature. The dimension of the cylindrical centering surface 24 compared to the inner diameter of protrusion 32 is such that when there is lateral movement of the manifold, it doesn't subject thread 26 to extreme forces, preventing lateral seizing of the threads. The combination of all dimensional tolerances and cold gaps, according to some embodiments, allows the system to have growth of only 0.001" to 0.003" subjected on the manifold and mold plates, thus eliminating excessive hobbing on manifold. As mentioned above, cold start-up leakage and heater failure leakage are prevented.

A further advantage of the present design is that it allows shipment of pre-assembled hot runner systems to customers, and easy on-site installation into molds. Although not shown in the figures, the nozzles can be provided with pre-installed and pre-wired heaters, and with nozzle tips suited to the specific application.

A further feature of this system allows for easy nozzle tip change without removal of the nozzle from the hot runner system. As shown in FIG. 6, a pair of dowels 60, fixedly attached to manifold 10 in the embodiment shown, project into clearance pockets 62 of nozzle 18. Pockets 62 are shaped to allow the relative motion caused by thermal expansion of the manifold relative to the nozzles as explained above (in the direction perpendicular to the page in FIG. 6, left and right in FIGS. 7 and 7a), but preventing nozzle 18 from rotating about axis Y-Y as the nozzle tip (not shown) is threadably disengaged or re-engaged into front end 68 of the nozzle, to deliver the flow of molten plastic into the molding cavity. Any suitable designs of nozzle tips may be used with the nozzle system described above, such as those disclosed in applicant's U.S. Pat. Nos. 7,207,795; 7,329,117; and 7,413,431, all of which are incorporated by reference herein. Although not shown in the figures, it should be understood that dowels 60 may alternatively be fixedly secured to nozzle 18, and pockets 62 may be accordingly provided in portion 22 of manifold 10.

Figure 12:
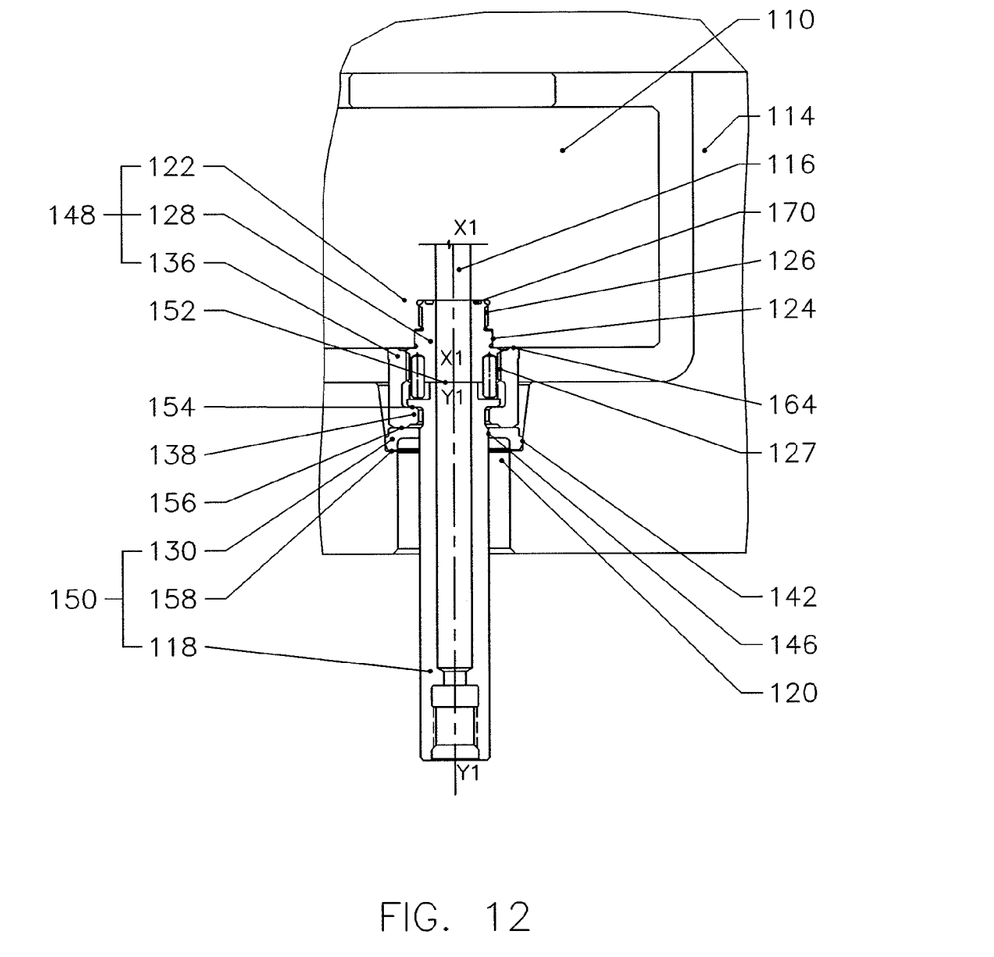
FIG. 12 is an enlarged view of FIG. 8.
Figure 13:
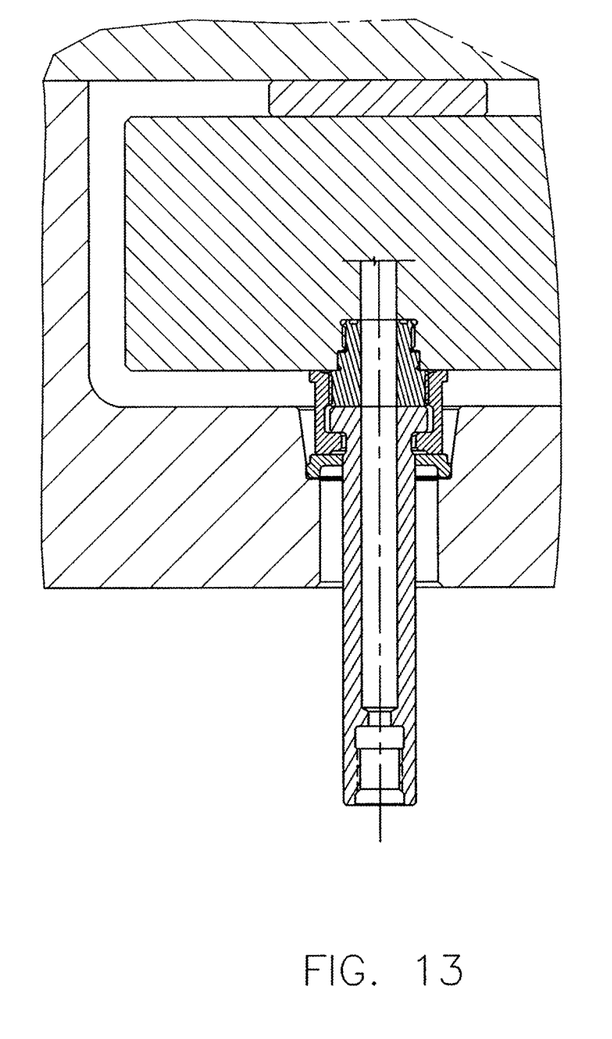
FIG. 13 is an enlarged view of FIG. 9.

A brief description of an alternative embodiment of the invention follows with reference to FIG. 12.

This embodiment additionally includes a puck 128 centered into a manifold 110 by a cylindrical surface 124 (concentric with a manifold outlet hole 116 having an axis X1-X1) and secured to manifold 110 by way of a thread 126. Puck 128 extends beyond the face of manifold 110, its protrusion having an outer thread 127. A collar bushing 136, having an inner shoulder portion 138, is threadably secured to puck 128 via thread 127 until collar bushing 136 is torqued firmly against manifold 110 at interface 164 according to proper torquing methods. A nozzle 118 and a centering support ring 130 (similar to those shown in the first embodiment) complete the nozzle assembly. Support ring 130 is centered along axis Y1-Y1 of mold plate pocket 120 by a cylindrical centering portion 142 of the mold plate pocket. Nozzle 118 is in turn centered along axis Y1-Y1 via an inner cylindrical surface 146 of support ring 130. This system has a preload at interfaces 152 (between puck 128 and nozzle 118) and 154 (between shoulder of nozzle 118 and inner shoulder portion 138 of collar bushing 136), and a cold gap at interfaces 156 (between puck 128 and centering support ring 130) and 158 (between centering support ring 130 and the bottom of the mold plate pocket).

As can be further seen in FIG. 12, puck 128 and collar bushing 136, together with portion 122 of manifold 110 adjacent the nozzle, form a packet 148 centered about axis X1-X1 of outlet hole 116, while nozzle 118 and support ring 130 form a packet 150, centered about axis Y1-Y1 of pocket 120 of mold plate 114. As the system is brought to operating temperature, axes X1-X1 and Y1-Y1 align, while the thermal expansion of the components achieves axial preload, effectively sealing against plastic leaks (puck 128 being outfitted with a seal ring 170 behind the thread, as an added measure). With the exception of the differences presented above, this system is similar to the previous embodiment, and will therefore not be described in more detail.

It will be appreciated that prior art designs suffer from a loss of alignment: the nozzle is in contact with the cooled mold plate at one end, and threadably secured to the expanding manifold at the opposite end, such that lateral thermal expansion of the manifold causes the nozzle axis to deflect at mold heat-up. A further challenge caused by such deflection is that nozzles threaded into the manifold must have a minimum length in order to allow axial deflection without snapping, minimum lengths usually being around 5.5"-6.0". The present design, allowing relative motion between packets 48 and 50 (or 148 and 150) as explained above, prevents the lateral thermal expansion of the manifold from deflecting the nozzle axis, thus posing no limitations on the shortness of nozzles allowed, therefore resulting in more compact stack sizes.

What is claimed is:

1. An injection molding nozzle system, comprising:
   a mold plate defining a first and a second pocket;
   a nozzle disposed in the second pocket, and defining a nozzle orifice extending in an axial direction and configured to inject molten material into a mold from a downstream end of the nozzle orifice, wherein an upstream end of the nozzle orifice defines a nozzle center when viewed in the axial direction;
   a manifold disposed in the first pocket, and defining a manifold orifice configured to supply the material to the nozzle orifice, wherein a downstream end of the manifold orifice is in fluid communication with the upstream end of the nozzle orifice, wherein the downstream end of the manifold orifice defines a manifold center when viewed in the axial direction;
   a centering support ring in the second pocket, configured to maintain the nozzle substantially stationary with respect to the second pocket; and
   a bushing extending between the first and second pockets, fixedly attached to the manifold and configured to move laterally with respect to the pockets and to the nozzle;
   wherein:
      at an ambient temperature:
         the nozzle center and the manifold center are offset from one another in a lateral direction substantially perpendicular to the axial direction;
         a first preload is defined between abutting surfaces of the nozzle and the bushing;
         a second preload is defined between abutting surfaces of the manifold and the nozzle; and
         a first gap is defined between the support ring and a shoulder at a downstream end of the second pocket; and in operation:

the manifold and the nozzle reach respective operating temperatures and thermally expand, such that the manifold moves laterally within the first pocket, and such that the nozzle remains substantially stationary within the second pocket, such that the nozzle center and the manifold center are substantially aligned in the lateral direction; and the first gap is closed by thermal expansion of various components of the system.

2. The system of claim 1, wherein, during operation, the first gap is closed to a third preload of approximately 0.001 inches to approximately 0.003 inches.

3. The system of claim 1, wherein a second gap is defined between the support ring and the bushing at the ambient temperature.

4. The system of claim 1, wherein the bushing is threaded into the manifold.

5. The system of claim 1, further comprising dowels disposed between the nozzle and the manifold to prevent rotational movement of the nozzle with respect to the manifold around the axial direction.

6. The system of claim 1, wherein the bushing comprises a flange abutting a downstream end of the manifold.

7. The system of claim 1, wherein the nozzle defines a notch, and wherein the bushing comprises a collar defining an inner shoulder portion slidable within the notch.

8. The system of claim 1, further comprising a puck disposed between the manifold and the bushing.

9. The system of claim 1, wherein the centering support ring is configured to maintain the nozzle substantially stationary at a position that is substantially centered with respect to the second pocket.

10. The system of claim 1, wherein the manifold defines a centering surface that maintains the bushing at a position fixedly attached to the manifold at the ambient temperature and during operation.

11. The system of claim 1, wherein the bushing is compressed at the ambient temperature, where the bushing presses against the nozzle, and presses the nozzles against the manifold, to define the preloads.

12. The system of claim 1, wherein the preloads are such that the molten material can be ejected from the nozzle at the ambient temperature without leaking.

13. The system of claim 1, wherein the system is a single cavity system, wherein the mold plate is exactly one mold plate, the nozzle is exactly one nozzle, the manifold is exactly one manifold, the centering support ring is exactly one centering support ring, and the bushing is exactly one bushing.

14. The system of claim 1, wherein the system is a multiple cavity system, wherein the nozzle comprises a plurality of nozzles.

15. A method of injection molding, comprising:

providing an injection molding nozzle system at an ambient temperature, the system comprising:

a mold plate defining a first and a second pocket;

at least one nozzle disposed in the second pocket, and defining a nozzle orifice extending in an axial direction and configured to inject molten material into a mold from a downstream end of the nozzle orifice, wherein an upstream end of the nozzle orifice defines a nozzle center when viewed in the axial direction; and a manifold disposed in the first pocket, and defining a manifold orifice configured to supply the material to the nozzle orifice, wherein a downstream end of the manifold orifice is in fluid communication with the upstream end of the nozzle orifice, wherein the downstream end of the manifold orifice defines a manifold center when viewed in the axial direction;

a centering support ring in the second pocket, configured to maintain the nozzle substantially stationary with respect to the second pocket; and a bushing extending between the first and second pockets, fixedly attached to the manifold and configured to move laterally with respect to the pockets and to the nozzle;

wherein at the ambient temperature:

the nozzle center and the manifold center are offset from one another in a lateral direction substantially perpendicular to the axial direction;

a first preload is defined between abutting surfaces of the nozzle and the bushing;

a second preload is defined between abutting surfaces of the manifold and the nozzle; and a gap is defined between the support ring and a shoulder at a downstream end of the second pocket;

the method further comprising:

routing the material through the manifold and the nozzle, wherein during the routing, the manifold and the nozzle reach respective operating temperatures and thermally expand, such that the manifold moves laterally within the first pocket, and such that the nozzle remains substantially stationary within the second pocket, such that the nozzle center and the manifold center are substantially aligned in the lateral direction, and such that the gap is closed by thermal expansion of various components of the system; and ejecting the material through the nozzle orifice into the mold.

* * * * *